United States Patent [19]

Rizzoli et al.

[11] Patent Number: 5,267,577
[45] Date of Patent: Dec. 7, 1993

[54] DEVICE FOR TRANSFERRING CIGARETTE PORTIONS FROM A DUAL-ROD PRODUCTION MACHINE TO A FILTER ASSEMBLY MACHINE

[75] Inventors: Salvatore Rizzoli, Bologna; Roberto Polloni, Modigliana; Bruno Belvederi, Martino Di Monte S. Pietro, all of Italy

[73] Assignee: G. D. Societa Per Azioni, Italy

[21] Appl. No.: 831,526

[22] Filed: Feb. 5, 1992

[30] Foreign Application Priority Data

Feb. 11, 1991 [IT] Italy ............... BO91A.000040

[51] Int. Cl.⁵ .................................................. A24C 5/00
[52] U.S. Cl. ..................................... 131/94; 131/282; 198/471.1; 198/474.1
[58] Field of Search ............ 131/94, 282, 84.1, 84.4; 198/471.1, 474.1, 477.1, 433

[56] References Cited

U.S. PATENT DOCUMENTS

| | | |
|---|---|---|
| 4,418,705 | 12/1983 | Seragnoli . |
| 4,570,643 | 2/1986 | Seragnoli . |
| 4,577,644 | 3/1986 | Grieben . |
| 4,645,063 | 2/1987 | Seragnoli . |
| 5,033,482 | 7/1991 | Belvederi et al. ............ 131/94 |
| 5,076,290 | 12/1991 | Rizzoli et al. ............ 131/94 |

FOREIGN PATENT DOCUMENTS

| | | | |
|---|---|---|---|
| 812319 | 4/1959 | United Kingdom | ............ 131/94 |
| 2199800A | 7/1988 | United Kingdom . | |

Primary Examiner—V. Millin
Assistant Examiner—J. Doyle
Attorney, Agent, or Firm—Marshall, O'Toole, Gernstein, Murray & Borun

[57] ABSTRACT

A device for transferring cigarette portions from a dual-rod production machine to a filter assembly machine, wherein a rotary transfer unit presents a number of heads, each having two seats for two respective portions of two continuous cigarette rods, and each rotating in such a manner as to move the respective seats along respective circular paths; the transfer unit being connected to a conveyor having first and second seats traveling along respective paths respectively tangent to the circular paths of the seats on the transfer heads at a loading station, and tangent to each other at a station wherein the cigarette portions are unloaded.

9 Claims, 2 Drawing Sheets

DEVICE FOR TRANSFERRING CIGARETTE PORTIONS FROM A DUAL-ROD PRODUCTION MACHINE TO A FILTER ASSEMBLY MACHINE

BACKGROUND OF THE INVENTION

The present invention relates to a device for transferring cigarette portions from a dual-rod production machine to a filter assembly machine. Here and hereinafter, the term "dual-rod production machine" is intended to mean a machine of the type described and claimed, for example, in U.S. Pat. No. 4,418,705, and which provides for feeding a filter assembly machine with two continuous cigarette rods traveling axially at substantially constant speed. At the output of the production machine, the two continuous rods are fed through a cutting head, usually a rotary type, which normally cuts both the rods into "double portions", i.e. twice the length of the portion which, joined to the filter, forms a normal filter-tipped cigarette. The double portions, pushed from behind by the respective continuous rods, continue traveling axially to a pickup station where they are engaged successively by the transfer members of a transfer unit located between the output of the production machine and the input roller of a filter assembly machine. A double portion from each rod is picked up simultaneously by each transfer member, and the pair of double portions so formed is transferred into consecutive seats on the input roller of the filter assembly machine.

As described and illustrated, for example, in U.S. Pat. No. 4,577,644, a filter assembly machine normally comprises, as of said input roller, a series of parallel feed rollers, each having a number of peripheral seats for receiving a respective double portion and feeding it forward crosswise in relation to its longitudinal axis, i.e. perpendicular to the traveling direction of the double portion at the output of the production machine. By virtue of the double portions being fed in pairs to the filter assembly machine, and undergoing, in the process, a 90° change in direction, the design and operating characteristics of the transfer unit must be such as to permit, not only said change in direction, but also correct loading of both double portions inside two consecutive seats on the input roller of the filter assembly machine.

In the case of a single input roller and a transfer unit featuring nonarticulated, independently-operating transfer members, correct loading necessarily consists in loading both double portions simultaneously (see, for example, U.S. Pat. No. 4,645,063), by virtue of the double portions and the seats on the input roller traveling in different directions, which normally only intersect at one point. Consecutive loading of the two portions (see, for example, U.S. Pat. No. 4,570,643) requires a highly complex transfer unit featuring articulated transfer members operating independently in relation to a respective supporting head, and which are unsuitable for high-output machines.

Though perfectly satisfactory, operation of the transfer unit described in U.S. Pat. No. 4,645,063, especially as regards simultaneous loading of the two double portions, is so complex as to substantially rule out any possibility of increasing the operating speed of current production machinery.

The reason for this lies in the final radial movement of the transfer member in relation to the input roller, which invariably results in damage to the cigarette portions, if performed over and above a given speed which is easily exceeded on modern production machinery.

SUMMARY OF THE INVENTION

It is an object of the present invention to provide a device for transferring cigarette portions from a dual-rod production machine to a filter assembly machine, designed to overcome the aforementioned drawback.

According to the present invention, there is provided a device for transferring cigarette portions from a dual-rod production machine to a filter assembly machine, said device comprising a transfer unit connectable to an output beam of said production machine, and rotating about a first axis crosswise in relation to the traveling direction of said portions along said beam; said transfer unit comprising a number of transfer heads equally spaced about said first axis, and each having two seats for transferring two respective portions of said two rods; each said head rotating about a respective second axis parallel to said first axis, for moving said seats respectively along a first and second circular path parallel to each other and extending about said first axis; characterised by the fact that it also comprises a conveyor having a number of first seats and a number of second seats for said portions; and first and second means for respectively supporting said first and second seats arranged respectively along a third and fourth circular path respectively tangent to said first and second circular path at a station wherein said portions are loaded on to said conveyor, and tangent to each other at a station wherein said portions are unloaded on to the input roller of said filter assembly machine.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
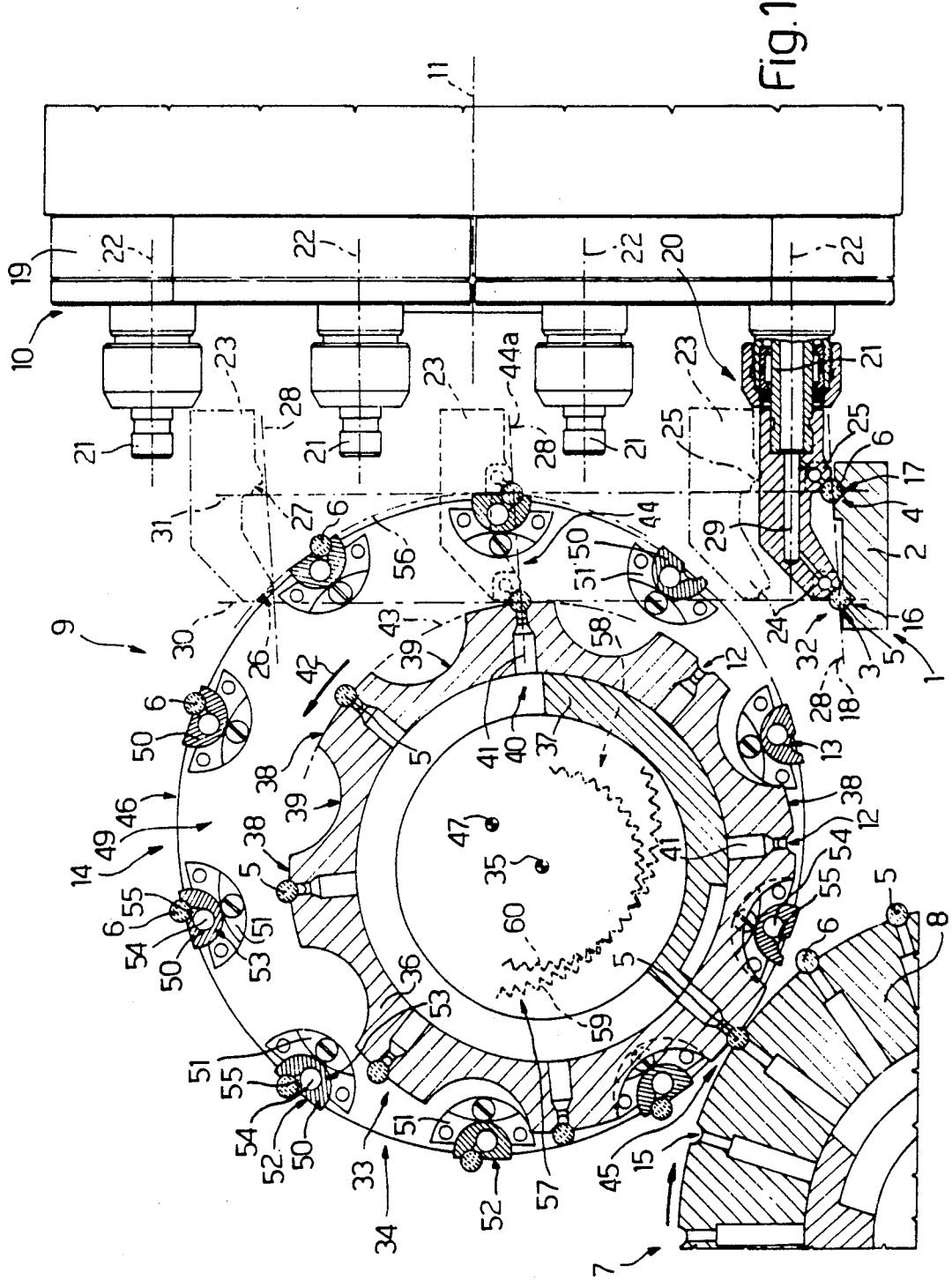
FIG. 1 shows a partially-sectioned, schematic side view of part of a preferred embodiment of a transfer device in accordance with the present invention.

Number 1 in FIG. 1 indicates a dual-rod cigarette manufacturing machine of the type described and illustrated in U.S. Pat. No. 4,418,705, to which full reference is made herein in the interest of full disclosure.

Machine 1 comprises an output beam 2 along which two continuous cigarette rods 3 and 4 are fed at substantially the same constant axial speed, and cut into respective portions 5 and 6 by a known rotary cutting head (not shown).

The speed of said cutting head is such as to produce portions 5 and 6 of twice the length of the tobacco-filled portion of a finished filter-tipped cigarette.

Number 7 in FIG. 1 indicates a filter assembly machine, the input roller 8 of which is connected to output beam 2 of machine 1 by means of a transfer unit or device indicated as a whole by 9 and designed to successively transfer portions 5 and 6 from beam 2 to machine 7. As shown in FIG. 1, beam 2 terminates beneath a rotary transfer unit 10 forming part of transfer unit 9 and which, rotating about its axis 11 perpendicular to beam 2, provides for successively transferring portions 5 and 6 into respective seals 12 and 13 on a conveyor 14, by which portions 5 and 6 are transferred successively into respective equally-spaced peripheral seats 15 on input roller 8, the spacing of seats 15 being half that of seats 12 and 13.

Beam 2 is positioned substantially horizontally, and presents, on top, two longitudinal grooves 16 and 17 along which slide respective rods 3 and 4, the axes of which define a plane 18 substantially parallel to axis 11.

Conveyor 14 and transfer unit 10 are arranged facing each other and, in use, on substantially the same side of plane 18.

Transfer unit 10 comprises a cylindrical platform 19 coaxial with, and rotating at constant speed about, axis 11; and a number of transfer heads 20 supported on, and extending axially from, platform 19 towards conveyor 14. Heads 20 are equally spaced about axis 11, and each comprise a hollow central supporting shaft 21 connected and rotating in relation to platform 19 about axis 22 parallel to axis 11; and a body 23 substantially in the form of a rectangular parallelepipedon, fitted to the free end of shaft 21 and having two transverse lateral ribs 24 and 25. Ribs 24 and 25 present the same spacing as grooves 16 and 17, and respective longitudinal seats 26 and 27 parallel to grooves 16 and 17 and defining plane 28. Seats 26 and 27 of each body 23 retain respective portions 5 and 6 by means of respective suction devices 29.

Platform 19 houses a known drive (not shown) of the type described and illustrated, for example, in U.S. Pat. No. 4,645,063. As platform 19 rotates about axis 11, said drive rotates shafts 21 about respective axes 22, so as to produce a translatory motion of seats 26 and 27 of each body 23 along respective parallel circular paths 30 and 31 extending about axis 11 and substantially tangent to beam 2. As seats 26 and 27 travel along respective paths 30 and 31, plane 28 defined by each pair of seats 26 and 27 is maintained parallel to plane 18 with which it coincides at a pickup station 32 on beam 2.

Figure 2:
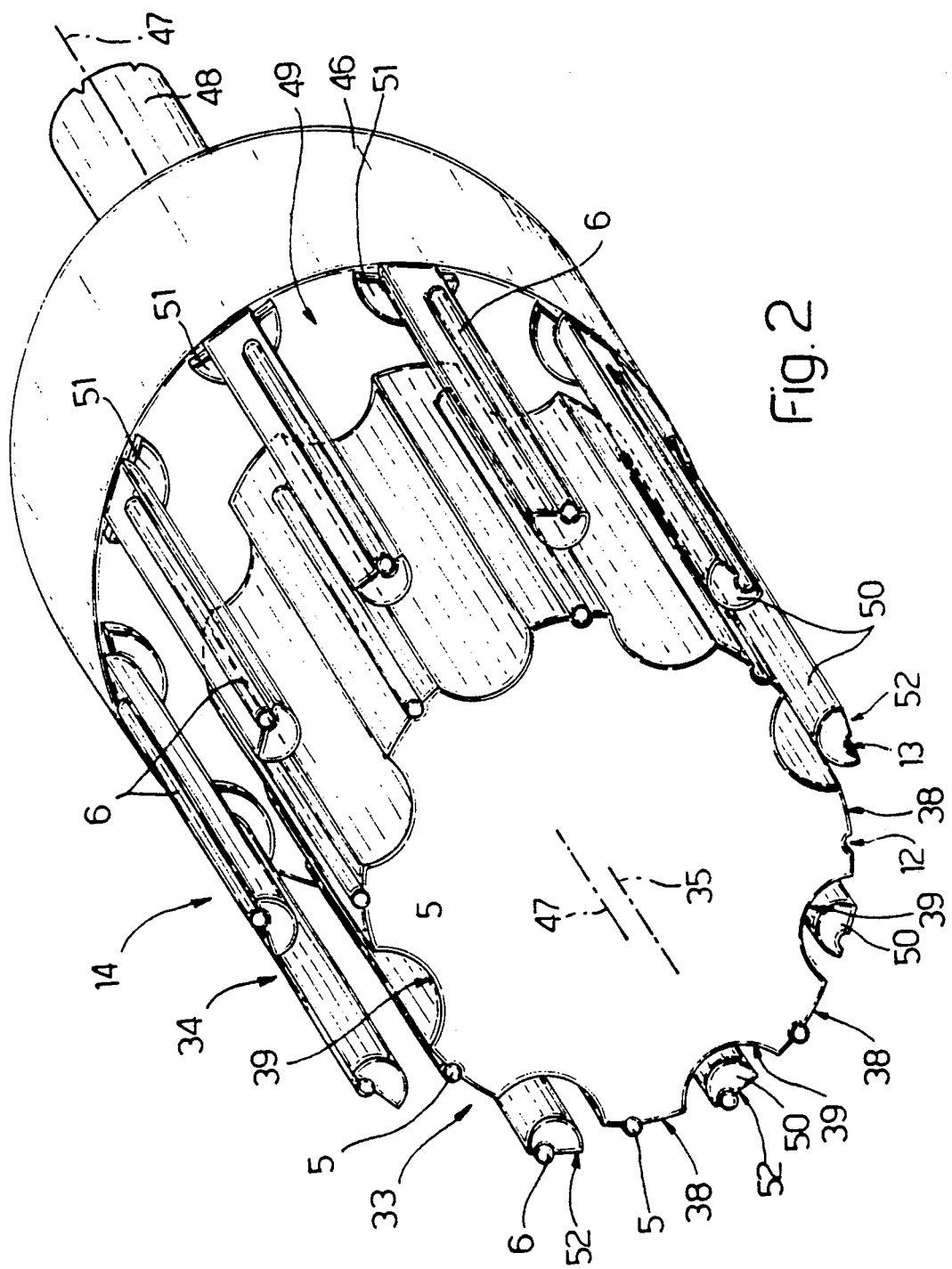
FIG. 2 shows a larger-scale view in perspective of a detail in FIG. 1.

As shown in FIGS. 1 and 2, conveyor 14 is a roller conveyor comprising a first roller 33 and a second roller 34 for respectively feeding portions 5 and 6 on to input roller 8 of filter assembly machine 7.

Roller 33 is a substantially cylindrical roller rotating at constant speed about an axis 35 perpendicular to axis 11 and parallel to grooves 16 and 17, and comprises an outer jacket 36 mounted for rotation on a fixed cylindrical inner jacket constituting a known pneumatic distributor 37. Jacket 36 is defined externally by a cylindrical surface divided into axial strips or segments 38 by a number of axial, substantially semicircular-section grooves 39. At the mid point of each strip 38, jacket 36 presents an axial groove constituting a seat 12 communicating with a known suction device 40 comprising distributor 37 and a respective radial hole 41 formed through jacket 36.

As roller 33 rotates about axis 35, seats 12 travel in the direction of arrow 42 in FIG. 1 along a circular path 43, which, on one side, is tangent to a portion of path 30 of seats 26 at loading station 44, and, on the other, is tangent to input roller 8 of filter assembly machine 7 at unloading station 45. Seats 12 only communicate with suction device 40 along the portion of path 43 extending between loading station 44 and unloading station 45 in the direction of arrow 42.

Second roller 34 is substantially in the form of a cylindrical cage, and comprises a substantially cylindrical platform 46 supporting in rotary manner roller 33 and coaxial with axis 47 of a drive shaft 48 (FIG. 2) parallel to axis 35. Platform 46 presents a front end surface 49 on the opposite side to that connected to shaft 48, and facing the axial end of roller 33. Roller 34 also comprises a number of columns 50 extending from the edge of surface 49, parallel to axes 35 and 47, and outside jacket 36.

Each column 50 is fitted integral with platform 46 by a respective foot 51, and is defined outwards by a cylindrical surface segment 52 having an axial groove constituting a respective seat 13. Seat 13 communicates with a known suction device 53 comprising, for each column 50, an axial hole 54 extending axially along column 50 and communicating with respective seat 13 via at least one substantially radial hole 55.

As shown more clearly in FIG. 1, the section of each column 50 is so designed as to fit entirely inside a groove 39 in jacket 36; and the spacing of columns 50 and respective seats 13 about the edge of surface 49 is the same as that of seats 12 and grooves 39, and twice that of seats 15 on input roller 8 of filter assembly machine 7.

According to a variation not shown, roller 33 also consists of a platform fitted with columns similar to columns 50 on roller 34, and defined outwards by cylindrical surface segments shaped and spaced like segments 38 and featuring respective seats 12.

As roller 34 rotates about axis 47, seats 13 travel in the direction of arrow 42 in FIG. 1 along a circular path 56, which, on one side, is tangent to path 31 of seats 27 at loading station 44, and, on the other, is tangent to input roller 8 of filter assembly machine 7 and path 43 at unloading station 45. Seats 13 only communicate with suction device 53 along the portion of path 56 extending between loading station 44 and unloading station 45 in the direction of arrow 42.

Rollers 33 and 34 are rotated about respective axes 35 and 47 by a drive device 57, which, in addition to drive shaft 48, also comprises a drive 58 housed inside platform 46 as shown by the dotted line in FIG. 1. Drive 58 is located between rollers 33 and 34, and is designed to rotate the side about respective axes 35 and 47 at the same surface speed, i.e. at rotation speeds the ratio of which is the opposite of that of the respective diameters.

In the FIG. 1 example, drive 58 is a planocentric drive comprising an internally-toothed ring gear 59 integral with platform 46 and fitted to shaft 48; and a pinion 60 coaxial with axis 35 and integral with roller 33. The number of teeth on ring gear 59 and pinion 60 present the same ratio as the diameters of rollers 34 and 33.

Rollers 33 and 34 are timed angularly so that, at unloading station 45, i.e. at the point of tangency between paths 43 and 56, a seat 12 is equally spaced between two adjacent seats 13, so as to define a succession of equally-spaced alternating seats 12 and 13 having the same spacing as seats 15 on input roller roller 8 of filter assembly machine 7.

Rollers 33 and 34 are also timed so that, when a seat 12 reaches loading station 44, i.e. the point of tangency between path 43 and path 30 of seats 26, a seat 13 also reaches loading station 44, i.e. the point of tangency between path 56 and path 31 of seats 27, and is positioned, together with respective seat 12, in a plane 44$a$ parallel to planes 28, and at a distance from seat 12 equal to that between seats 26 and 27 of body 23.

Finally, conveyor 14 is timed in relation to transfer unit 10 so that loading station 44 is reached simultaneously by a pair of seats 12 and 13 and by two seats 26 and 27 of a body 23.

For the above to be achieved, the number of seats 13 on roller 34 is obviously greater than that of seats 12 on roller 33.

Two portions 5 and 6 are therefore fed simultaneously by a respective head 20 to loading station 44, where they are gripped simultaneously by rollers 33 and 34 inside respective seats 12 and 13, which portions 5 and 6 are fed by respective rollers 33 and 34 at the same surface speed to unloading station 45. In view of the greater circumference of roller 34, however, seats 12 and 13 do not reach unloading station 45 simultaneously, but are offset by an odd multiple of half the distance between seats 12 and 13. In the example shown, between loading station 44 and unloading station 45, each seat 12 precedes by one and a half spaces the corresponding seat 13 at loading station 44.

Portions 5 and 6 are therefore transferred continuously, along substantially circular paths, from beam 2 to unit 10, and from unit 10 to conveyor 14, thus minimizing the stress on portions 5 and 6, and enabling extremely high transfer speeds.

We claim:

1. In a filter-cigarette manufacturing unit comprising a dual-rod production machine having an output beam, and a filter assembly machine having an input roller provided with spaced longitudinal seats, a transfer device for transferring cigarette portions, advancing in a traveling direction along said beam, from the dual-rod production machine to the filter assembly machine, the transfer device comprising a transfer unit arranged between said output beam and said input roller for rotation about a first axis crosswise in relation to said traveling direction; the transfer unit comprising a number of transfer heads equally spaced about said first axis, and each having first and second seats for transferring two respective portions of said two rods; each said head being mounted for rotation about a respective second axis substantially parallel to said first axis, for moving said first and second seats respectively along a first and second annular path parallel to each other and extending about said first axis; and a conveyor having a number of third seats and a number of fourth seats for said portions, and first and second means for respectively supporting said third and fourth seats arranged respectively along a third and fourth annular path respectively tangent to said first and second annular path at a loading station wherein said portions are loaded onto said conveyor, and tangent to each other at an unloading station wherein said portions are unloaded onto said input roller.

2. A transfer device as claimed in claim 1, wherein said first and second supporting means are provided with drive means for feeding said third and fourth seats at the same speed through said loading and unloading stations.

3. A transfer device as claimed in claim 2, wherein the third and fourth seats are so positioned on the respective supports that, when a third seat is located in the loading station, a fourth seat is also positioned in the loading station, and defines, with said third seat, a plane parallel to the plane defined by said two rods on said beam.

4. A transfer device as claimed in claim 1, wherein the third and fourth paths are circular paths.

5. A transfer device as claimed in claim 3, wherein said conveyor is a roller conveyor comprising rollers having axes extending substantially parallel to said traveling direction and crosswise in relation to said first axis.

6. A transfer device as claimed in claim 5, wherein said roller conveyor and said transfer unit are arranged facing each other and on substantially the same side of said plane defined by the two rods on said beam.

7. A transfer device as claimed in claim 1, wherein said first and second supporting means comprise a first and second conveyor roller rotating about respective axes parallel to each other and to said traveling direction; said first roller being smaller in diameter than, and located inside, said second roller; and both said rollers being tangent to each other and to said input roller at said unloading station.

8. A transfer device as claimed in claim 7, wherein said third and fourth seats are equally spaced on said respective conveyor rollers, the spacing of said third and fourth seats being twice that of the seats on said input roller.

9. A transfer device as claimed in claim 8, wherein at least said second roller is substantially in the form of a cylindrical cage comprising a number of equally-spaced peripheral axial columns; each said fourth seat being formed on a respective said column.

* * * * *